(No Model.) 2 Sheets—Sheet 1.

W. M. DRESSKELL.
ELECTRIC MOTOR.

No. 483,431. Patented Sept. 27, 1892.

WITNESSES:
Donn Twitchell
C. Sedgwick

INVENTOR:
W. M. Dresskell
BY Munn & Co.
ATTORNEYS

THE NORRIS PETERS CO., PHOTO-LITHO., WASHINGTON, D. C.

(No Model.) 2 Sheets—Sheet 2.
W. M. DRESSKELL.
ELECTRIC MOTOR.
No. 483,431. Patented Sept. 27, 1892.
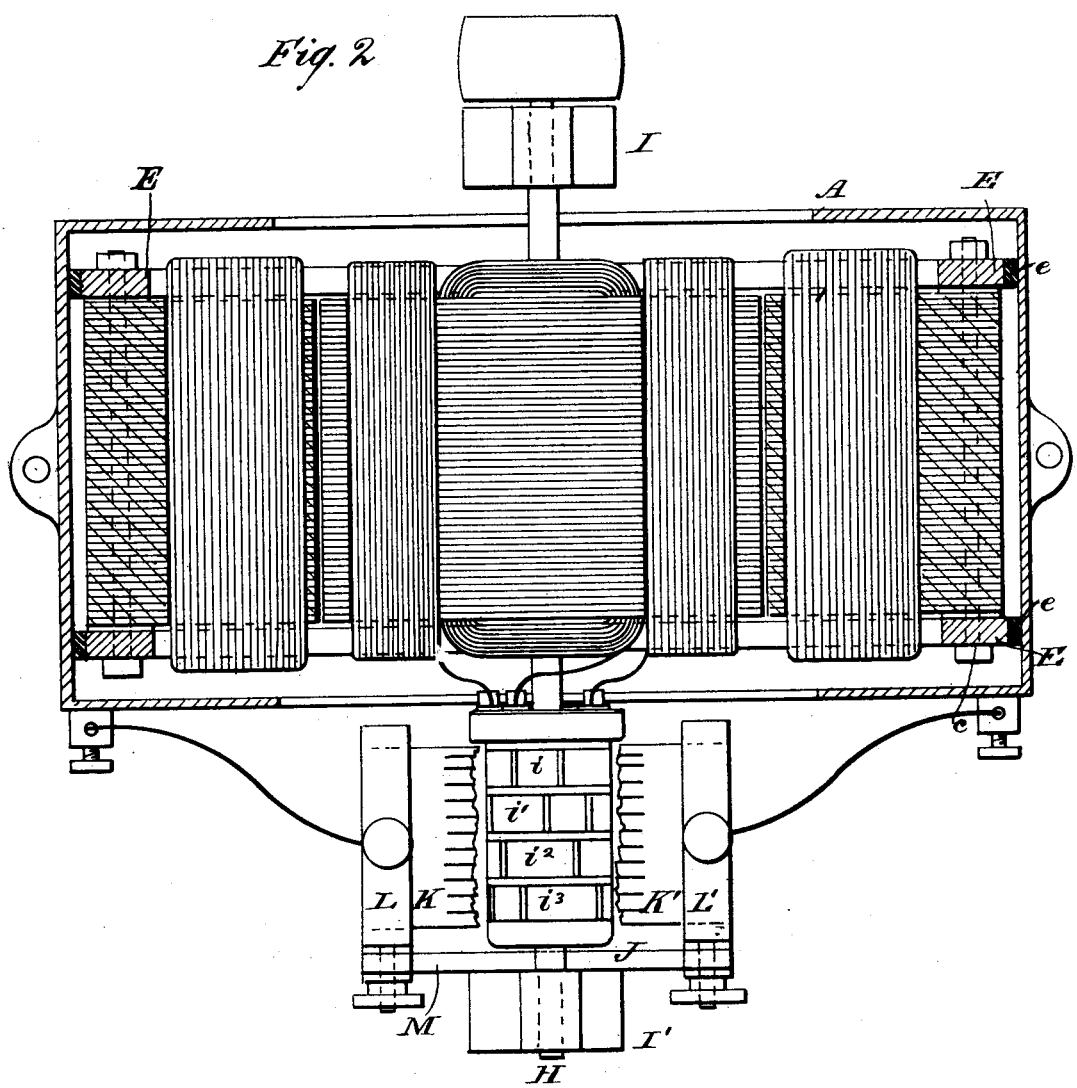
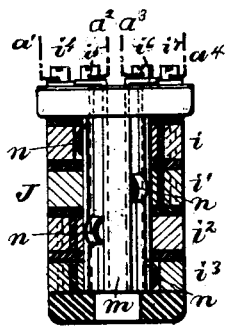
WITNESSES:
Dom Twitchell
C. Sedgwick
INVENTOR:
W. M. Dresskell
BY
ATTORNEYS
THE NORRIS PETERS CO., PHOTO-LITHO., WASHINGTON, D. C.

UNITED STATES PATENT OFFICE.

WILLIAM M. DRESSKELL, OF BRAINERD, MINNESOTA.

ELECTRIC MOTOR.

SPECIFICATION forming part of Letters Patent No. 483,431, dated September 27, 1892.

Application filed June 23, 1891. Serial No. 397,195. (No model.)

*To all whom it may concern:*

Be it known that I, WILLIAM M. DRESSKELL, of Brainerd, in the county of Crow Wing and State of Minnesota, have invented a new and Improved Electric Motor, of which the following is a specification, reference being had to the annexed drawings, forming a part thereof, in which—

Figure 1:
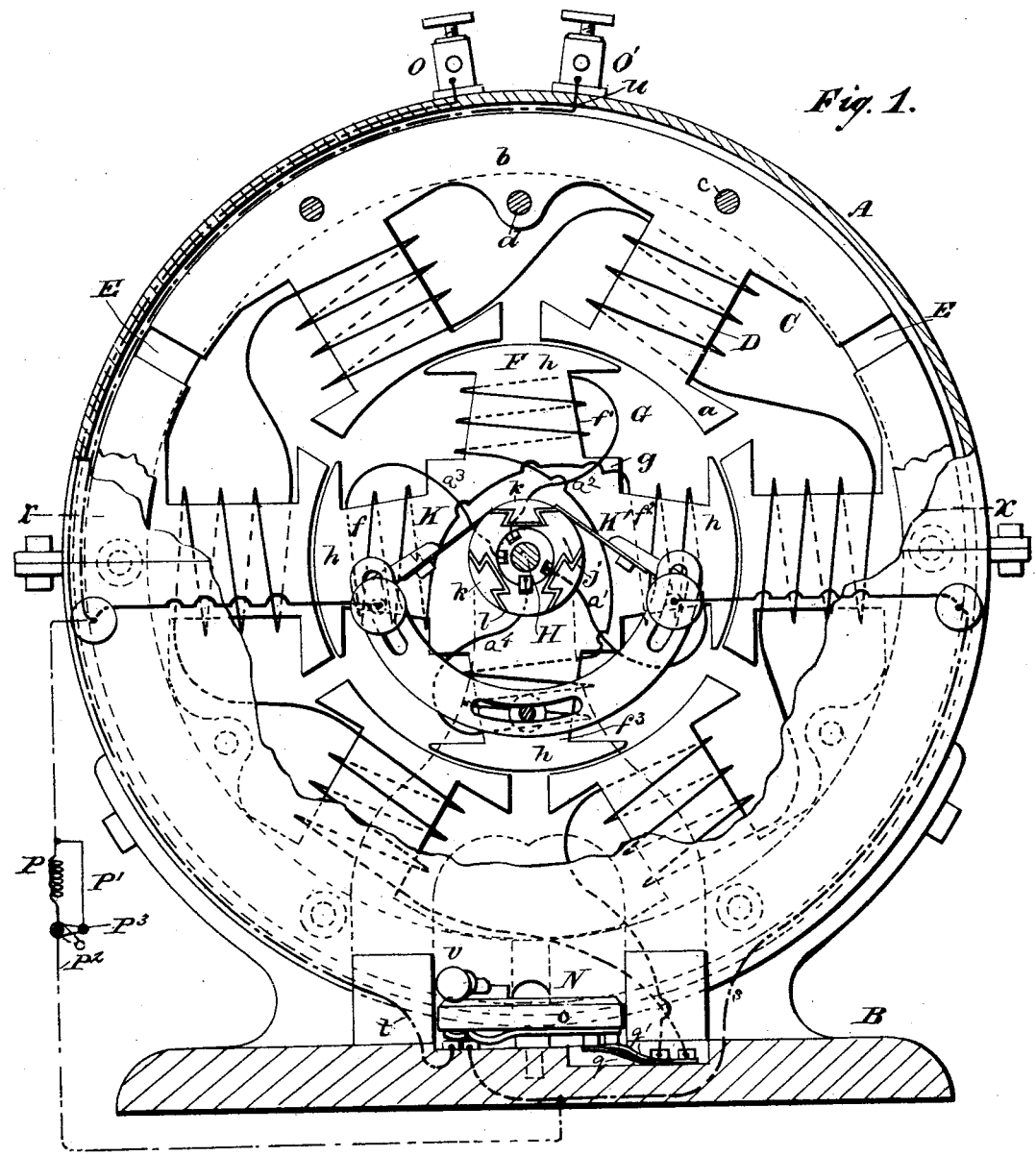
Figure 4:
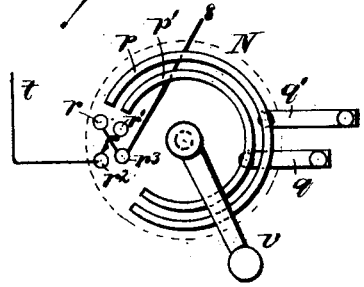

Figure 1 is a side elevation, partly in section, of my improved electric motor, showing internal parts in dotted lines. Fig. 2 is a horizontal section taken on line $x\ x$ in Fig. 1. Fig. 3 is a longitudinal section of the commutator, and Fig. 4 is a plan view of the current-reversing switch.

Similar letters of reference indicate corresponding parts in all the views.

The object of my invention is to construct an electric motor which may be operated by an alternating or direct current and in which the sections of the commutator may be readily removed and replaced without disarranging any of the adjustments of the machine.

My object is also to provide a simple, convenient, and efficient switch for reversing the current in the field-magnet of the machine.

My invention consists in a multipolar field-magnet formed of laminated circular segments and clamping-rings and bolts for holding the segments in the position of use, a multipolar armature having a less number of poles than the field-magnet, and a commutator formed of a series of disks, each provided with a series of contact-surfaces, with the contact-surfaces arranged with reference to the poles of the armature, so as to reverse the polarity of the armature as many times during its revolution as there are field-magnet poles.

The invention also consists in a switch formed of a pair of revoluble curved bars, contact-springs touching the bars, and oppositely-arranged contact-points for establishing connection with the curved bars, all as will be hereinafter more fully described.

The cylindrical casing A, which is mounted on the base B, contains the annular field-magnet C, provided with the inwardly-projecting radial pole-pieces D, having enlarged polar extremities $a$. The field-magnet C is made in laminated sections $b$, (in the present case three in number,) each built up of plates of soft iron having the profile of the sections of the field-magnet. These plates of soft iron are insulated from each other by any of the well-known methods, such as the interposition of thin sheets of paper, of varnish, or of iron oxide between the laminæ.

The three sections of the field-magnet are clamped in the position of use by rings E, placed on opposite sides of the yokes of the magnets, and bolts $c$, extending through the rings and plates of the magnet. The are also further secured by intermediate bolts $d$, which pass through apertured inwardly-projecting ears formed on the sections between the two pole-pieces. The pole-pieces of the field-magnet are wound alternately in opposite directions, so as to produce alternate north and south poles around the armature-space in the center of the annular magnet. The clamping-rings E of the field-magnets are separated from the casing A by rings $e$, of insulating material.

The core F of the armature G is provided with four radial arms $f\ f'\ f^2\ f^3$, projecting from the hub of a central portion $g$ at right angles to each other, the arms being preferably tapered, as shown, the narrower outer end of each arm being provided with a laterally-expanded polar extremity $h$. The armature-core is built up of plates of iron separated by insulation, as in the case of the field-magnet. The shaft H, which supports the armature G, is journaled in the standards I I', secured to the base B.

Upon the shaft H, between the standard I' and the armature G, is mounted the commutator J, formed of four separate sections $i\ i'\ i^2\ i^3$. These sections of the commutator are precisely alike in form and vary only in their position on the shaft relative to the brushes, which will presently be described. Each section consists of a disk formed of a three-armed central portion $j$, into which are dovetailed segments $k$, with an intervening insulating-septum $l$, thus providing on the periphery of the disk segments capable of completing and breaking the circuit in alternation six times in each section of the armature during the revolution of the commutator. The commutator-disks are mounted on an insulating-sleeve $m$, placed on the shaft H, and in the sleeve are secured four conductors $i^4$ $i^5$ $i^6$ $i^7$, each provided with an outwardly-bowed contact-spring $n$. The commutator-disks are slotted to receive these springs, each disk being slotted according to its position in the commutator, so that should the commutator become broken or from other causes require to be removed and renewed it may be done with a certainty of placing each disk properly upon the sleeve $m$ and bringing it into proper relation with the armature. The conductors $i^4$ $i^5$ $i^6$ $i^7$ terminate in binding-screws for receiving one set of the terminals $a'$ $a^2$ $a^3$ $a^4$ of the four coils of the armature, the other set being connected diametrically across the armature, thus connecting up the armature-coils in diametrically-opposite pairs. The brushes K K' are held by bars L L', inserted in a curved yoke M, clamped to the standard I'. The ends of the bars L L' pass through slots in the curved yoke M and are adjustable therein, and the bolt or screw which clamps the curved bar to the standard I' passes through a slot in the yoke, which permits of adjusting both of the brushes simultaneously. The brushes touch the top of the commutator, and they are arranged with reference to each other at an angle of about one hundred and twenty degrees, the distance between the ends of the brushes being about equal to the width of one of the segments of the commutator-disks.

Upon the base B is arranged a switch N for reversing the current through the field-magnets, so as to reverse the direction of the rotation of the armature. The disk $o$, which is pivoted to the base B, is provided with two curved metallic strips $p$ $p'$, concentric with the disk. These strips are pressed by contact-springs $q$ $q'$, and in the base, in the path of the curved strips, are arranged the contact-points $r$ $r'$ $r^2$ $r^3$. The points $r$ $r^3$ are connected with the wire $s$, leading to the brush K', and the points $r'$ $r^2$ are connected with the wire $t$, leading to the binding-post O. The binding-post O' is connected by a wire $u$ with the brush K. The wire leading to the contact-point $r^3$ is connected with a resistance P, which in turn is connected with the wire leading to the brush K. The contact-springs $q$ $q'$ are connected electrically with the terminals of the field-magnet, so that the field-magnet is in the shunt-circuit. The disk $o$ is provided with a handle $v$, by which it may be turned. When the switch is turned in one direction, the ends of the curved strips $p$ $p'$ are brought in contact with the points $r$ $r'$, thus causing the current to flow in one direction through the field-magnet; but when the switch is turned in the opposite direction, so as to bring the opposite ends of the strips $p$ $p'$ into contact with the points $r^2$ $r^3$, the current is reversed in the field-magnet, thus causing a reversal of the motion of the armature. The brushes K K' are of sufficient width to cover the entire face of the commutator J, and as the armature revolves the current is reversed in each section of the armature as the arms of the central portion of the section pass from one commutator-brush to the other. The sections of the commutator are arranged so that the reversals of the current in the coils of the armature occur in regular rotation six times during the revolution of the armature—that is, as each pole of the armature approaches and recedes from one of the poles of the field-magnet.

Resistance P is placed in the circuit of the motor to facilitate starting, and a shunt P', with the switch $P^2$, is provided for cutting out the resistance after the motor is started. To start the motor, the resistance is thrown in by opening the shunt-circuit by turning the switch $P^2$, as shown in dotted lines, and the resistance is short-circuited by the shunt P' by turning the switch $P^2$ so as to contact with the point $P^3$ of the shunt.

Having thus described my invention, I claim as new and desire to secure by Letters Patent—

1. In an electric motor, the combination of a cylindrical casing, a field-magnet formed of circular segments having the cores and pole-pieces with enlarged extremities formed integrally with the segments, the said segments being provided with inwardly-projecting ears for receiving one of the clamping-bolts, a clamping-ring for holding the circular segments in the position of use, and insulation interposed between the clamping-rings and the cylindrical casing, substantially as specified.

2. In an electric motor, a commutator formed of series of disks or contact-pieces insulated from each other and a series of conductors provided with contact-springs for forming electric contacts with the several disks, substantially as specified.

3. In an electric motor, a current-reversing switch formed of two curved bars, two contact-springs in constant contact with the bars, and two pairs of electric contacts arranged in the path of the curved bars, substantially as specified.

WILLIAM M. DRESSKELL.

Witnesses:
MILTON McFADDEN,
JNO. N. HAVERS.